United States Patent [19]

Stone

[11] Patent Number: 4,501,473

[45] Date of Patent: Feb. 26, 1985

[54] FRONT LIGHTED SHADOWGRAPHIC METHOD AND APPARATUS

[75] Inventor: William J. Stone, Kansas City, Mo.

[73] Assignee: The United States of America as represented by the United States Department of Energy, Washington, D.C.

[21] Appl. No.: 347,758

[22] Filed: Feb. 11, 1982

[51] Int. Cl.³ .............................................. G02B 5/30
[52] U.S. Cl. .................................................. 350/407
[58] Field of Search ............... 350/403, 408, 372, 384, 350/399, 407; 356/390, 392, 393, 394, 365, 510

[56] References Cited

U.S. PATENT DOCUMENTS

| | | |
|---|---|---|
| 2,318,705 | 5/1943 | Morgan. |
| 3,007,371 | 11/1961 | Tallman. |
| 3,180,216 | 4/1965 | Osterberg. |
| 3,405,990 | 6/1965 | Nothnagle et al. |
| 3,652,163 | 3/1972 | Borkowski et al. |
| 3,926,500 | 12/1975 | Frosch et al. |

Primary Examiner—Bruce Y. Arnold
Attorney, Agent, or Firm—James H. Chafin; Albert Sopp

[57] ABSTRACT

High contrast silhouette images of a substantially opaque object are obtained using front illumination techniques. The object is frontally illuminated by light of a first polarization. A frontal surface of the object reflects the incident light to an observation station. The polarization of incident light bypassing the object and incident on a background is changed. The background light is reflected to the observation station, and the intensity of one of the two, differently polarized, reflected images is substantially reduced with respect to the other. Apparatus for carrying out the method includes a first polarizer for polarizing frontally incident illuminating light, a second polarizer behind the object and a reflective surface behind the second polarizer. A polarization analyzer, located in front of the object, is used to extinguish one of the two reflected images. Apparatus for carrying out the invention in instruments having a polarized light source and a polarization analyzer includes a combination of a polarizing material, for contacting a rear surface of the object, and a reflective surface provided adjacent the rear surface of the polarizing material. The combination is applied to the rear surface of the object. Back-surface mirrors of pleochroic substrates applied to thin film physical vapor deposited electronic circuit elements enable front lighted shadowgraphic imaging of the elements.

13 Claims, 2 Drawing Figures

U.S. Patent  Feb. 26, 1985  4,501,473
Fig. 1
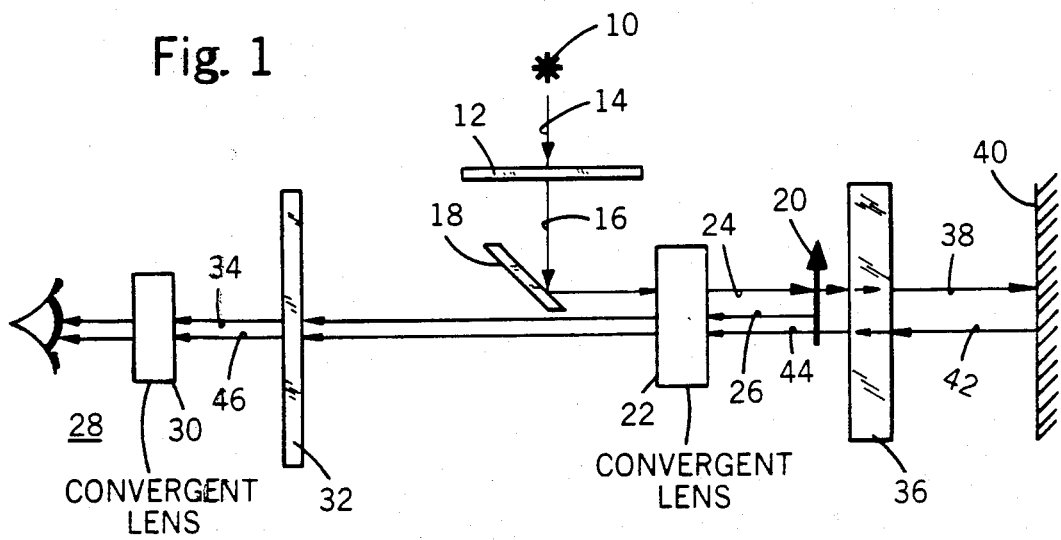
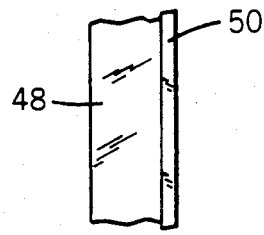
Fig. 2

FRONT LIGHTED SHADOWGRAPHIC METHOD AND APPARATUS

The U.S. Government has rights in this invention pursuant to Contract No. DE-AC04-81AD-13564 between the U.S. Department of Energy and the Bendix Corporation. (41 CFR Section 9-9.109-6(i)(5)(ii)(b)).

BACKGROUND OF THE INVENTION

The present invention relates to the field of optical inspection of object contours, and more specifically, to an apparatus and method for providing front lighted, high contrast images of an object against its background.

In the art of manufacturing electronic components, it is typical to inspect the components in order to determine various features and characteristics thereof, such as shape, contour, size and the like. Such inspection is particularly useful in examination of physical vapor deposited electronic elements on printed circuit-type boards. In these devices, adherence to rigorous specifications on the size, shape, position, orientation and assembly registration may be determined by automatic image analysis of sharp, uniform shadow projections of the electronic elements and the arrays in which they are formed.

In the areas of thin film manufacture and development, contours and component areas and circuit lands are typically inspected optically by backlighted shadowgraph or profile projection techniques. Resultant sharp images permit the use of automated image analysis systems, such as computer analysis of video images, for example.

In many instances, however, the circuit to be inspected, including the circuit elements and the substrate thereof, is encased in an opaque assembled product, whether by mounting on an opaque substrate, by encapsulation, or by enclosure in an opaque container. Such opaque modules cannot be examined by the techniques of back lighting and use of transmitted light to provide a shadow, much less a clear, sharp, high contrast shadow image. Moreover, inasmuch as the circuit elements themselves are frequently specular reflectors, the use of front lighting for imaging of the objects is similarly difficult.

A further problem in attempting to view the elements, or their substrates, is the spotty nature of images produced by the elements, since typically neither the element nor the substrate forms a good mirror. Rather, both the element and substrates typically reflect and diffuse incident light unevenly, thus producing the spotty images with insufficient contrast in optical brightness and a lack of image uniformity which makes automatic image analysis of the contours and dimensions difficult.

In summary, the precision patterns of most modern electrical circuitry formed of physical vapor deposited metals on a transparent plastic substrate cannot now be inspected by transmitted back light which provides optimal profile projection. Such inspection is precluded by the opacity of the reverse-side circuitry and other stereo hindrances. Classical front lighting techniques yield reduced optical contrast between the object being viewed and its background, and provides excessive brightness variation within the image of the object due to spectral flares and shadows from surface imperfections. The object, in other words, cannot be readily resolved from its background.

In U.S. Pat. No. 3,180,216 to Osterberg, a variable phase microscope is described for enhancing the contrast of an object being examined. The disclosed apparatus, which operates by rotation of a deviated light vector to obtain destructive interference with a transmitted light vector over the image of a particle, thereby enhancing the contrast between the particle and its surround, is complex. A laser is required, and a plurality of coherent light beams are needed to illuminate the specimen. A multiapertured, opaque disk is utilized.

Prior art microscopes utilizing polarization in backside illuminated objects are known, as illustrated by the disclosure of U.S. Pat. No. 3,007,371 to Tallman. For the reasons previously described, such microscopes cannot be used for imaging opaque objects mounted on substrates.

A frontally illuminated specimen is inspected in a system disclosed in the U.S. Pat. No. 2,318,705 to Morgan. The patent teaches the use of polarizing elements, to filter reflected light from the objective of a microscope examining the specimen, in order to reduce fogging of the image. The disclosure does not, however, teach either a method or an apparatus for imaging the specimen against a bright background with frontal illumination. Rather, light reflected by an object is eliminated by a polarizing screen, while light passing through the objective to speciman 38 is passed by the polarizing screen.

SUMMARY OF THE INVENTION

Accordingly, it is a primary object of the present invention to provide apparatus for forming frontally illuminated, high contrast silhouette imaging of a substantially opaque object against its background.

It is another object of the invention to provide a method for viewing frontally illuminated, high contrast images of a substantially opaque object against a background.

It is still another object of the invention to provide apparatus for forming high contrast, frontally illuminated images of a substantially opaque object against a background.

It is still another object of the invention to provide apparatus for forming high contrast, frontally illuminated images of a substantially opaque object against a background in an instrument having a source of polarized light and a polarization analyzer.

It is a more specific object of the invention to provide enhanced contrast, frontally illuminated images of an opaque object by reflection of linearly polarized light incident thereon to a polarization analyzer at an observation station, and further to provide light reflected by a reflecting surface behind the object to the polarization analyzer. The light from the reflecting surface is provided with a polarization different from the incident light which passes through a substrate disposed between the object and the reflecting surface. One of the images represented by the light rays reflected by the object or by the reflecting surface is to be extinguished to provide the desired image.

Still a more specific object of the invention is to obtain enhanced contrast images of a shiny object mounted on a thin pleochroic substrate by illuminating the object with linearly polarized light, by passing the polarized light around the edges of the object through the pleochroic material to alter the polarization, and by reflecting the light with the altered polarization to a polarization analyzer along with specularly reflected light from the object, thereby permitting substantial reduction in the intensity of one of the reflected beams with respect to the intensity of the other.

Additional objects, advantages, and other novel features of the invention will be set forth in part in the description that follows and in part will become apparent to those skilled in the art upon examination of the following, or may be learned with the practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the viewing apparatus of this invention provides high contrast silhouette images of a substantially opaque object against a background. The invention may comprise a first polarizing means for polarizing a beam of light to illuminate the object from a frontal direction. Polarized illuminating light is reflected by the object to an observation station at the front side of the object. A second polarizing means, located behind the object, is provided to change the polarization of illuminating light bypassing the object and passing through the second polarizing means. The bypassing light, with its changed polarization, is reflected by a reflective surface behind the object and behind the second polarizing means, through the second polarizing means and towards the observation station at the front of the object. A polarization analyzer, in front of the object, reduces the intensity of one of the two reflections provided to the observation station more than the intensity of the second reflection.

More specifically, the inventive structure includes an objective lens, between the first polarizing means and the object, for focusing the polarized light on the object, and an eyepiece may be provided for observing the reflections at the observation station.

It is also preferred that the pleochroic material is formed as a substrate of the object being inspected, and that the reflective surface comprises a front surface mirror in intimate contact with the pleochroic material.

In a further aspect of the present invention, in accordance with its objects and purposes, the viewing apparatus hereof may comprise a pair of optical paths for providing light of two different polarizations to an observation station. The first optical path, including a first polarizing means, provides frontal illumination of an object to be observed with light of a first polarization, and further provides light specularly reflected by the object of the observation station. The second optical path includes a second polarizing means, behind the object, and a reflecting surface behind the second polarizing means for receiving frontal illuminating light which has not been obstructed by the object being inspected. Finally, a contrast enhancing means may be provided between the object and the observation station for reducing the intensity of one of the two reflected light beams with respect to the other.

In still a further aspect of the present invention in accordance with its objects and purposes, an apparatus for providing high contrast, frontally illuminated imaging of a substantially opaque object may include a combination of a polarizing material and a reflective surface. The polarizing material contacts the rear surface of the object being inspected, and the reflective surface is provided on a surface of the polarizing material opposite to the surface contacting the object. Preferably, the polarizing material is comprised of pleochroic material.

In still a further aspect of the present invention in accordance with its objects and purposes, a method for viewing high contrast images of a substantially opaque object against a background may comprise the steps of illuminating light incident on the front surface of the object to an observation station. The method may further include the step of changing the polarization of frontal illuminating light passing beyond the contours of the object and onto the background of the object to a second polarization. The background light, having a second polarization, is reflected to the observation station, and the intensity of light having one of the two polarizations is substantially reduced with respect to the other.

In another aspect of the invention, polarizing material is combined with a reflecting surface, and the combination is applied to the backside of an object being inspected. The object is illuminated with polarized light, and an analyzer adjusted substantially to reduce the intensity of either the light reflected by the reflecting surface or the light reflected by the object.

The present invention thus provides method and apparatus for viewing high contrast images of opaque objects which cannot be illuminated from the rear. The invention thus permits automated image analysis of thin film electronic circuits mounted on substrates, notwithstanding the mounting of other circuit components on the obverse side of the substrate. Visual observation of the contours and area of the electronic devices is enabled by the use of an eyepiece for human observation, for example. The invention further permits the inspection of appropriately treated electronic circuit components by existing instruments having a standard light polarizing and analyzing means.

Still other objects and features of the present invention will become more readily apparent to those skilled in the art from the following description wherein there is shown and described a preferred embodiment of the invention, simply by way of illustration of one of the best modes contemplated for carrying out the invention. As will be realized, the invention is capable of other, different, embodiments and its several details are capable of modifications in various obvious aspects, all without departing from the invention. Accordingly, the drawings and descriptions will be regarded as illustrative in nature and not as restrictive.

BRIEF DESCRIPTION OF THE DRAWINGS

The accompanying drawings, incorporated in and forming a part of the specification, illustrate several aspects of the present invention, and, together with the description, serve to explain the principles of the invention. In the drawings:

FIG. 1 illustrates an optical viewing system incorporating the present invention; and FIG. 2 shows structure in accordance with the invention for enabling existing optical systems to observe various devices in accordance with the principles of the invention.

DETAILED DESCRIPTION OF THE INVENTION

Reference is now made to FIG. 1, showing an improved optical viewing system incorporating the present invention. The invention employs the novel approach of applying a polarized beam of light to an object and reflecting that beam to an observation station. Portions of the beam which bypass the object and pass on to a background therefor are differently polarized for reflection to the same observation station. A polarization analyzer is placed between the sources of reflected light (i.e., the object and background) and the observation station in order to extinguish one of the two differently polarized reflected light beams, thereby providing an enhanced contrast silhouette image.

As seen in FIG. 1, an incident lighting source 10 is provided with a first polarizer 12. Following the path of a single light ray 14 emanating from light source 10, it is appreciated that subsequent to passage through polarizer 12 the light ray, now labeled 16, is polarized. A prism reflector 18 directs the polarized light rays at the object to be inspected, shown as 20 in the figure. An objective lens 22 is used to focus the light rays, shown at 24, on object 20.

While the present invention finds particular application in the field of physical vapor deposited aluminum patterns provided on a substrate, it is to be understood that the concepts disclosed herein are applicable to many other fields of interest.

The incident light ray 24 illuminates object 20 and is reflected thereby. For clarity, the reflected light ray 26 is shown in the figure in a separate path. The reflected light ray 26, similarly to the incident light ray 24, is linearly or plane polarized. This ray passes through lens 22 and proceeds onward to an observation station 28. At observation station 28, a lens 30 may be provided for focusing the reflected image on an observer's eye. It is to be understood, however, that observation means other than the human eye may similarly be used. For example, an electronic solid state photosensor may be provided. Alternatively, a video or silver process camera may be used. In such circumstances, eyepiece 30 may not be required since the viewing camera is provided with its own optics.

Between the object and the observation station, a polarization analyzer 32 is provided. Linearly polarized light ray 26 thus passes through analyzer 32 prior to reaching the observation station as light ray 34. As will be appreciated by those skilled in the art, the orientation of analyzer 32 may be altered, thereby to vary the transmitted fraction of light ray 26 and, consequently, the intensity of light ray 34. The reflected image of light source 10 provided by object 20 may thus be made progressively darker by appropriate orientation of analyzer 32.

Portions of incident light ray 24 which bypass object 20 are made to pass through a second polarizer 36. The light ray emanating from second polarizer 36 is shown at 38. A reflecting surface 40 is provided behind the second polarizer. Light ray 38 is reflected by surface 40 and is shown as a reflected light ray 42 which again passes through second polarizer 36. The polarization of light ray 42 is thus altered by polarizer 36 so that light ray 44 is provided with a polarization which differs from that of light ray 26. This result follows from the fact that light ray 26 maintains the polarization provided by first polarizer 12, while the polarization of light ray 44 includes the effects of first polarizer 12 and the double passage through second polarizer 36.

Light ray 44, similar to light ray 26, passes through analyzer 32 prior to reaching the observation station 28.

It should thus be appreciated that light rays 34 and 46, reaching the observation station 28, are differently polarized from one another by virtue of the different light paths traversed thereby from light source 10 to the observation station 28. Light ray 34 arrives at the obsrevation station 28 after traversing a first path including first polarizer 12, prism 18, objective 22, reflection by object 20, and passage through objective 22 and analyzer 32. Light ray 46, however, traverses a second path, having portions in common with the first path (polarizer 12, prism 18, objective 22 and analyzer 32) as well as a distinct portion. The distinct portion of the second path results from bypassing object 20, passage through second polarizer 36, reflection by reflecting surface 40, and a second passage through second polarizer 36.

As previously described, the appropriate orientation of second polarizer 32 may be used to alter the intensity of light ray 34. Similarly, the orientation of analyzer 32 affects the intensity of light ray 46. Inasmuch as the two light rays have different polarizations from one another, it is possible by properly orientating the analyzer to diminish the intensity of one of the light rays with respect to the other. More specifically, it is possible completely to extinguish one of the two light rays with respect to the other.

The present invention accordingly provides for extinguishing the image of the object being inspected with respect to its background, or alternatively, for extinguishing the image of the background with respect to the object. In either case, contrast enhancement is obtained between the object and its background, thus providing a silhouette effect, having high contrast contours, with a front lighting arrangement.

In the preferred embodiment, second polarizer 36 may comprise any non-linear polarizer. For example, a layer of Kapton, which forms a substrate of physical vapor deposited aluminum patterns, may be used to provide the desired variation in the polarization of light ray 24.

In the particular example of the present invention, wherein aluminum circuit patterns deposited on Kapton substrates are frontally illuminated to provide shadowgraphic images, a Zeiss polarizer may be used for first polarizer 12. The light entering a microscope formed by objective 22 and eyepiece 30 encounters a Zeiss H-PR POL 473616 prism reflector and illuminates the object through the objective lens. The object, a circuit element mounted on a Kapton substrate, thus includes the second polarizer 36.

When the object is illuminated in such a manner, light is reflected back from the object to the microscope by the two mechanisms previously described. Specular light from the object essentially maintains the plane polarized characteristic of the light source, and a portion of the reflected light ray 26 passes the 473616 prism reflector and encounters analyzer 32 which may be of the type Zeiss 473662.

The portion of the incident plane polarized light represented by ray 24 which bypasses object 20 and passes through the second polarizer 36 undergoes a different process. Each passage through the polarizer provides an additional 20 degrees rotation to the major axis of the light beam's polarization through partial absorption of the extraordinary beam. Thus, light ray 38 is elliptically polarized, and reflected ray 42 is provided with an additional 20 degrees rotation upon passage through second polarizer 36. Accordingly, where polarization analyzer 32 is oriented at 90 degrees with ray 26, ray 34 is extinguished while ray 44 passes through the analyzer with insignificant loss, resulting in a bright field background for a crisp, shadow-like image of the opaque object.

Referring now to FIG. 2, a combination of a polarizing lamina 48 and a front mirror reflecting surface 50 is shown for application to an opaque object. A Kapton layer having a mirrored reflecting surface may be used to provide the desired combination. It should be appreciated that such a laminate may be applied to any opaque object and, by the principles hereinabove described, provide frontally illuminated shadowgraphic images in any optical instrument which includes polarized illuminating light and a polarization analyzer.

While the foregoing description of the present invention describes the use of a substrate formed of a sheet plastic material, and more specifically describes the use of the polyamide Kapton (trademark of DuPont) which has a pleochroic characteristic, is should be understood that dichroic or birefringent materials are equally valuable, and that, moreover, any material providing a polarization to a light beam which differs from the polarization of the light beam incident on the opaque object mounted thereon is similarly useful. The second polarizer thus may be linear or non-linear, the latter term encompassing both elliptical and circular polarizers, although non-linear polarizers are preferred. Further, the reflecting surface 40 is preferably in intimate contact with the second polarizer, although such intimate contact is not necessary to practice the invention.

It should be understood further that the reflector 18 may be a prism reflector or a partially silvered mirror. The reflector may extend through half the optical diameter of the instrument and may be completely opaque or may be partially reflecting and extend through the entire optical path. In order to avoid multiple reflections, it is preferred that the reflecting surface behind the second polarizer 36 be a frontal reflecting surface. The reflective surface may be physical vapor deposited on the rear surface of the second polarizer.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto.

I claim:

1. Viewing apparatus for providing high contrast silhouette imaging of a substantially opaque object, comprising:

first polarizing means for polarizing a beam of light illuminating the object, the beam of light incident onto the front of the object, said first polarizing means thereby providing a first polarization to light reflected by the object towards an observation station located in front of the object;

second polarizing means, located behind the object, for effecting a change in the polarization of any illuminating light bypassing the object and passing through said second polarizing means;

a reflective surface located behind the object and separated therefrom by said second polarizing means for reflecting light passing through said second polarizing means toward said observation station, said second polarizing means and said reflective surface thereby providing at the observation station light which bypassed the object and which has a second polarization;

third polarizing means located in front of the object for reducing the intensity of observed light of one of said first and said second polarizations more than that of the other of said first and said second polarization, whereby frontally illuminated images of the object are observed in silhouette, with either the object or its background silhouetted against the other.

2. Viewing apparatus as recited in claim 1 further comprising first focusing means for focusing light onto the object provided by said first polarizing means, and second focusing means for focusing light on a viewing means at the observation station.

3. Viewing apparatus as recited in claim 2 wherein said first focusing means comprises an objective lens of a microscope and said second focusing means comprises an eyepiece of a microscope.

4. Viewing apparatus as recited in claim 3 wherein said objective lens is located between said first polarizing means and the object.

5. Viewing apparatus as recited in claim 2 wherein said second polarizing means comprises pleochroic material.

6. Viewing apparatus as recited in claim 5 wherein said third polarizing means comprises extinguishing means having a polarizing material for extinguishing said plane polarized illuminating light which is specularly reflected by the object.

7. Viewing apparatus as recited in claim 5 wherein said pleochroic material is formed as a substrate of the object, and wherein the object comprises an electrical circuit component mounted on said substrate.

8. Viewing apparatus as recited in claim 5 wherein said reflective surface comprises a front surface mirror.

9. Viewing apparatus as recited in claim 8 wherein said front surface mirror is in intimate contact with said pleochroic material.

10. Viewing apparatus for providing high contrast imaging of a substantially opaque object obstructing passage of light to a background, comprising:

(a) a first optical path for frontally illuminating the object with light of a first polarization and for providing light specularly reflected by said object to a frontally located observation station, said first optical path including a light source, an object, and a first polarizing means located between the light source and the object;

(b) a second optical path for providing light of a second, different, polarization representing a background of the object, to the observation station said second optical path including a second polarizing means behind the object and a reflecting surface behind said second polarizing means, said reflecting surface receiving and reflecting frontal illuminating light unobstructed by the object, and (c) contrast enhancing means, located between the object and the observation station, for substantially reducing the intensity of one of the specular reflection of said first polarization and the reflected background light of said second polarization with respect to the other.

11. Viewing apparatus as recited in claim 10 wherein said first polarizing means provides plane polarization to the frontally illuminating light, and said second polarizing means comprises pleochroic material mounted behind the object, said first and said second optical paths further comprising an objective lens for focusing said polarized frontally illuminating light on the object, said contrast enhancing means being in a common portion of said first and said second optical paths and comprising a polarization analyzer oriented for substantially extinguishing one of said first and second polarizations received at the observation station, and wherein a further focusing means is provided for focusing light received at the observation station on a viewing means.

12. A method for viewing high contrast images of an object against a background, comprising the steps of:

frontally illuminating the object with light of a first polarization;

reflecting said frontal illuminating light to an observation station;

changing the polarization of light passing beyond the contours of the object and incident on the background to a second polarization;

reflecting the light of said second polarization from the background to the observation station; and substantially reducing the intensity of the light, provided to the observation station, which has one of the two polarizations with respect to the light which has the other polarization.

13. The method of claim 12 wherein said step of substantially reducing the intensity of the light comprises using a polarization analyzer to reduce the intensity of light of one of the two polarizations with respect to the other.

* * * * *